March 29, 1927.

C. HUTH

PACKING OF ROTARY SHAFTS

Filed Sept. 29, 1925

Carl Huth
by his attorney
Karl Viertel

Patented Mar. 29, 1927.

1,622,911

UNITED STATES PATENT OFFICE.

CARL HUTH, OF STUTTGART, GERMANY, ASSIGNOR TO THE FIRM FEODOR BURGMANN, OF DRESDEN-LAUBEGAST, GERMANY.

PACKING OF ROTARY SHAFTS.

Application filed September 29, 1925, Serial No. 59,397, and in Germany May 13, 1924.

My invention relates to the packing of rotary shafts. One object of my invention is to effectively prevent the loss of lubricating oil frequently discharged at the lateral ends of shaft bearings, change-gear boxes and like members e. g. of automobiles and other means of conveyance.

Another object of my invention is to provide a packing which will well resist deterioration through heat and will retain its proper sealing effect also under high temperatures and in hot climates.

Another object of this invention is to automatically return the lubricating oil, adhering to the rotary shaft and freely spreading along the latter, to the respective bearings so as to prevent its being spilled about and adjoining parts becoming soiled by oil and dust.

With these and other objects in view I have invented a novel type of packing rings the design and application of which will be fully understood from the following specification taken in connection with the accompanying drawings in which—

Figure 1:
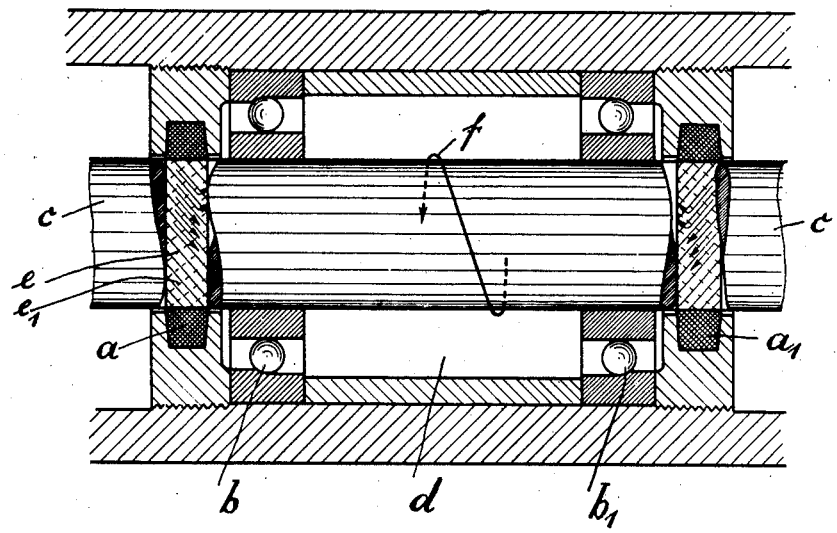
Figure 2:
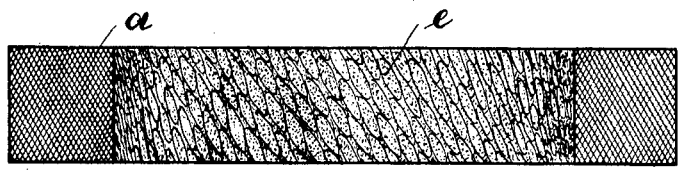
Figure 3:
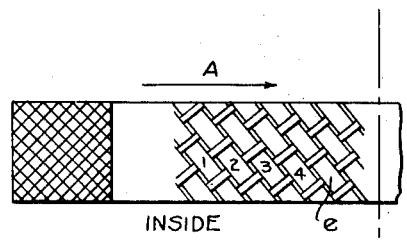

Fig. 1 by way of an example shows a shaft bearing in section provided with packing rings according to my invention, Fig. 2 is a section through a packing ring in a larger scale, and Fig. 3 is a diagrammatic view of a portion of a packing ring.

Packing rings according to my invention are made of a series of layers of woven fabric, alternately pasted together, the innermost layer of which, i. e. that adjacent to the shaft, presenting at its surface a net work of channels formed by the warp and weft threads of said fabric. The threads of the fabric layer facing the shaft are obliquely disposed with regard to the main axis of the shaft, so as to helically surround the latter, i. e. the sides proper of the threads being in contact with the shaft in contradistinction to packing slabs and rings known in the art of rod packing in which the ends of the threads of a fibrous texture are directed against the surface of the rod.

I prefer to make rings of said structure of a spirally wound up ribbon of asbestos-fabric the various layers of said ribbon being pasted together by means of a semi-liquid india rubber composition known in the art of making packing rings.

I further propose to use an asbestos-fabric the warp threads of which are thicker than the weft threads thereby producing a series of helical yet relatively straight channels along the warp threads in which the lubricating oil spreading along the shaft from the lubricator will be thrown backwards by reason of its adhesion to the shaft and the respective oblique disposition of the said channels, relatively to the shaft, the cooperation of the shaft and of said channels being comparable in its essence to that of a screw-conveyor.

In the drawing $a$, $a_1$ designate packing rings according to my invention cooperatively connected with the ball bearings $b$, $b_1$ of the shaft $c$, the latter being abundantly supplied with lubricating oil from the oil receptacle $d$.

The arrangement and position of the warp threads $e$ of the rings $a$, $a_1$ is diagrammatically indicated by full lines in Fig. 1 while the weft threads $e_1$ are indicated by dotted lines.

The shaft $c$ is supposed to rotate in the direction of the arrow $f$. It will be noted, that the position of respective warp threads $e$ of both rings is inverse, with regard to their angle to the shaft, viz, conformably to the lubricating oil flowing along the shaft from the center in opposite directions.

Fig. 2 shows in a more natural i. e. perspective way of illustration the arrangement of the threads of the packing ring in which by reason of the specific structure of the fabric the warp threads $e$ appear to the spectator like rows of grains of rye.

Fig. 3 shows somewhat diagrammatically the structure of the fabric. It will be seen that the warp threads $e$ are shown at an angle of about 40° to the axis of the shaft. This angle may be varied considerably, so long as it is less than 45° and at least as large as 5°, but the most effective results are obtained with an angle of about 40°. The importance of this arrangement is that the prominences of threads running in the same direction lie in helical rows running toward the inside of the bearing in the direction of rotation of the shaft, so that with the shaft rotating in the direction of the arrow A, a globule of oil striking the prominence 1 will be moved to the lower end of the same, and will be caught by the successive prominences 2, 3, and 4 and moved a little nearer the inside of the ring, since each of these successive prominences is a little nearer the inside of the ring than the last.

Packing rings according to my invention when soaked with oil will keep their yielding properties and resist comparatively high temperatures without any perceptible deterioration or wear.

It will be noted that various changes in the arrangement, form and structure of the packing rings described above may be made without materially deviating from the spirit and the main ideas of my invention.

What I claim is:

1. A packing ring for rotary shafts, the inner surface of which presents a woven texture of fibrous material, having warp and weft threads, the warp threads being more prominent than the weft threads, said threads being arranged in effective position, obliquely to the axis of the shaft, so as to helically surround the latter and to form a net work of channels, the latter being adapted to act as a labyrinth packing.

2. A packing ring having the features set forth in claim 1, characterized therein, that the warp threads of the woven texture are thicker in diameter than the weft threads respectively.

3. A packing ring for inhibiting the flow of oil from the sides of bearings of rotary shafts, said ring having a surface formed of coarse woven threads on the side adapted to engage the shaft, the prominences of the threads running in the same direction lying in helical rows running toward the inside of the bearing in the direction of rotation of the shaft.

In testimony whereof I have signed my name to this specification.

CARL HUTH.